W. B. HARDY AND J. J. PIQUÉ.
APPARATUS FOR COOLING AND FREEZING OF FISH AND THE LIKE.
APPLICATION FILED OCT. 12, 1920.
1,422,570.
Patented July 11, 1922.
2 SHEETS—SHEET 1.
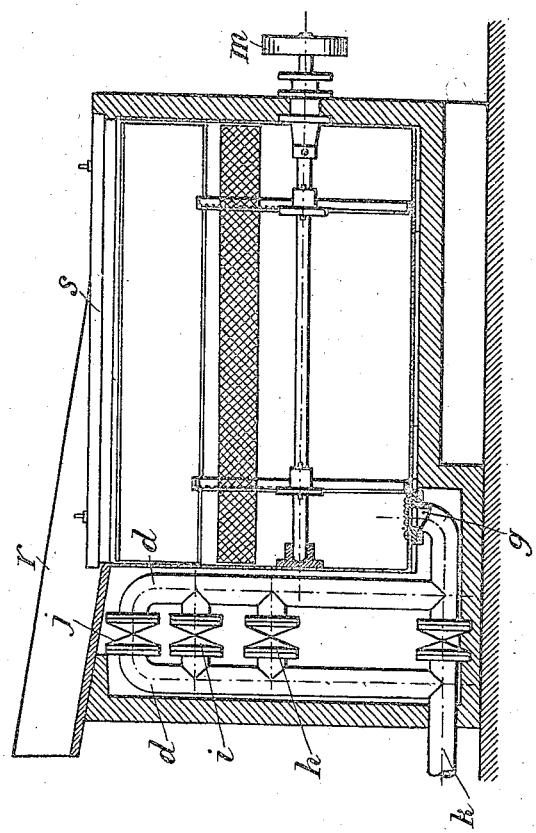
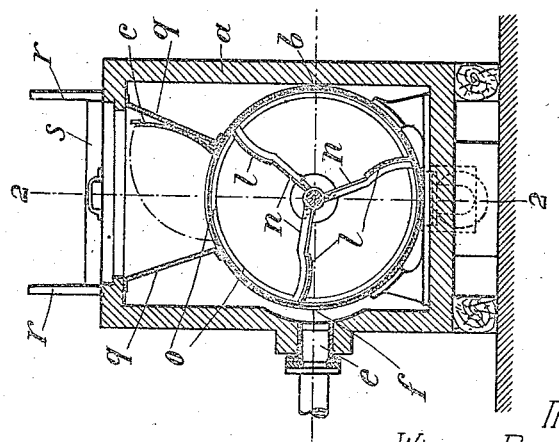
INVENTORS:
WILLIAM BATE HARDY
JEAN JULIEN PIQUÉ.
ATTORNEY.

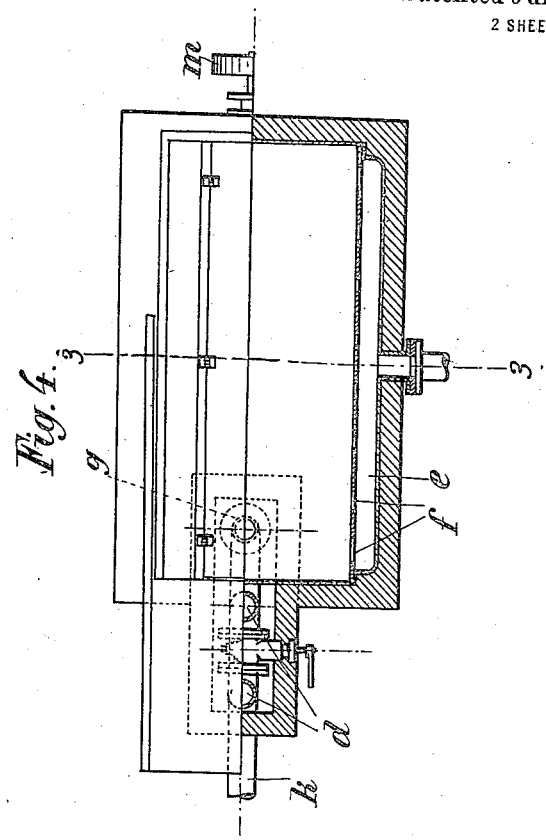
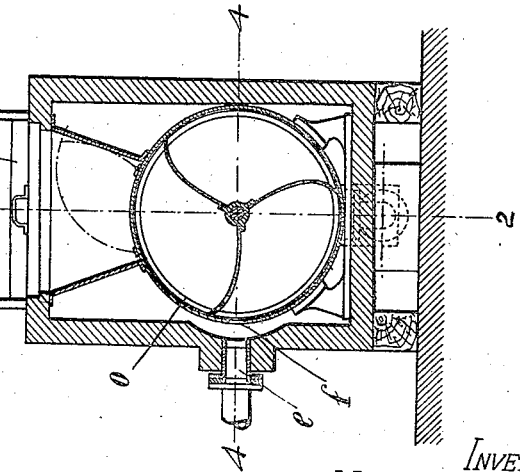

UNITED STATES PATENT OFFICE.

WILLIAM BATE HARDY AND JEAN JULIEN PIQUÉ, OF WESTMINSTER, LONDON, ENGLAND.

APPARATUS FOR COOLING AND FREEZING OF FISH AND THE LIKE.

1,422,570.     Specification of Letters Patent.     Patented July 11, 1922.

Application filed October 12, 1920. Serial No. 416,508.

(GRANTED UNDER THE PROVISIONS OF THE ACT OF MARCH 3, 1921, 41 STAT. L., 1313.)

*To all whom it may concern:*

Be it known that we, WILLIAM BATE HARDY, a subject of the King of England, director of food investigation, and JEAN JULIEN PIQUÉ, engineer, a subject of the King of Belgium, and residents of Westminster, London, S. W. 1, have invented certain new and useful Improvements in Apparatus for Cooling and Freezing of Fish and the like (for which we have filed an application in England August 22, 1919), of which the following is a specification.

This invention relates to the cooling and freezing of fish and the like. It will herein be described with reference to the freezing of fish but it is not limited thereto. For instance, it may be applied to the cooling or freezing of meat or fruit and in many other instances, and it may be used in connection with brine cooling or freezing, the brine being composed not necessarily of a sodium chloride solution but any suitable salt in solution including saltpetre, or it may be applied with other than brine solutions, such as a solution of sugar.

The object of this invention is to provide a convenient and rapid apparatus for the purposes described.

The invention consists in an apparatus for cooling or freezing by immersing the articles to be treated in a liquor kept in rotation or movement by means of rotating arms or paddles.

The invention also consists in a means for cooling and freezing articles which tend to float or do not tend to sink in the freezing liquor, which consists in causing relative motion betwen the liquor and the articles by means of a rotating paddle.

The invention also consists in an apparatus for the purpose described including a cylindrical chamber with a rotating paddle therein extending substantially the length of the chamber and fitting more or less closely against its sides, the paddles carrying curved or otherwise shaped blades extending from the central axis towards the circumference of the cylindrical chamber.

The invention also consists in apparatus for the purpose described including a cylindrical chamber provided with a door capable of being swung back on its hinges to permit ready removal of the chilled contents, which on leaving the cylindrical chamber float up into a gutter formed by two plates or boards extending substantially the full length of the chamber.

The invention also consists in apparatus for the purpose described, with an arrangement of pipes and valves permitting regulation of level of the cooling liquor and distribution of the inlet therefor over the whole length of the chamber.

Referring to the accompanying diagrammatic drawings:

Figure 1 is a cross sectional elevation;

Figure 2 is a longitudinal section through a convenient form of apparatus upon the line 2—2 of Figure 1 according to the present invention;

Figure 3 is a sectional elevation thereof on line 3—3 of Figure 4 with a modified form of paddle blade, and Figure 4 is a half plan and half sectional view on line 4—4 of Figure 3.

In carrying the invention into effect in one form illustrated by way of example in Figures 1 to 4, we provide an outer insulated tank *a* of substantial rectangular cross section containing an inner chamber *b* cylindrical in form but having a feed opening at the top to receive the articles to be cooled or frozen, and provided with a hinged lid *c*. At one side of the cylindrical chamber there is provided a passage *e* for the inlet of cooling liquor. The cylindrical chamber is perforated at *f* which perforations are of different sizes to obtain a uniform distribution of the cooling liquor. Perforations *f* are covered with a convenient mesh to prevent the fish from sticking to them. The lower part of the chamber *a* is provided with an outlet *g* through which the cooling liquor passes away through valves *h*, *i*, or *j* to the pipe *k*, to permit the desired circulation and regulate the height of the liquid in the chamber. Outlet *g* is covered with a gauze of large enough mesh to permit the passage of scales washed from the fish. Within the cylindrical chamber a propeller or rotatable paddle is arranged, preferably extending the whole length of the container and fitting as closely as may be against the walls thereof at the tips of the blades. A three-blade propeller with curved blades *l* mounted upon arms *n* or other suitable propeller is provided and is furnished with a pulley *m* for driving this propeller at any suitable speed.

The blades are formed preferably of wire netting or perforated plate, and extend either from the arms $n$ to the propeller of the cylindrical chamber, where they are secured to angle iron rings $o$, as indicated in Figures 1 and 2, or from the spindle $p$ to the periphery, as indicated in Figure 3, or are otherwise arranged. Above the chamber $b$ a gutter $q$ is formed, into which the material to be treated may be introduced through a chute $r$. The valves $h$, $i$ and $j$ provide a convenient means for adjusting the level to which the cooling liquor will rise within the chamber $b$.

In operation, fish are placed in chute $r$, the cover $s$ being removed and lid $c$ opened. The valve $h$ is opened, the valves $i$ and $j$ being closed, and the fish are fed into the cylindrical chamber $b$. The door $c$ is then shut, the cover $s$ replaced, and the valve $i$ opened and valve $h$ closed. The level of cooling liquor thus rises above the top of the cylindrical chamber and prevents the formation of scum owing to air being mixed with the liquor on rotation of the paddles. The whole external surface of the articles is continuously cooled by the flow of renewed cold brine through $f$ thus effecting a rapid cooling or freezing. The articles being kept in motion, they do not stick together or freeze in a block which retards the cooling of the inside articles, but each article freezes singly. After rotation of the paddles for a sufficient period to effect the necessary cooling or freezing, the cover $s$ is removed, the lid $c$ opened, and the valve $j$ opened and the valve $i$ closed ($h$ still remaining closed). The level of liquor is thus raised to near the top of the gutter $q$ and the fish may be removed readily by raking out or otherwise.

Having now fully described our said invention, what we claim and desire to secure by Letters Patent, is:

1. In a device for freezing perishable articles, a tank having a feed opening, an inner chamber, a butter disposed within the tank for directing articles to the interior of the inner chamber, a cover for closing the feed opening, a chute for directing articles to the gutter, means for supplying and regulating a quantity of fluid to the inner chamber, and agitating means operating in the inner chamber.

2. In a device for freezing perishable articles, a tank having a top opening, an inner chamber having a feed opening, means for directing articles to the inner chamber, the wall of the inner chamber having various sized openings formed therein, wire mesh material positioned over the inner chamber, curved blades formed of wire mesh material operating in the inner chamber, and means for regulating the quantity of fluid in the inner chamber.

In testimony whereof we have hereunto set our hands in presence of two witnesses.

WILLIAM BATE HARDY.
JEAN JULIEN PIQUÉ.

Witnesses:
 FREDA LAXTON,
 LUCIE BAKER.